Figure 1:
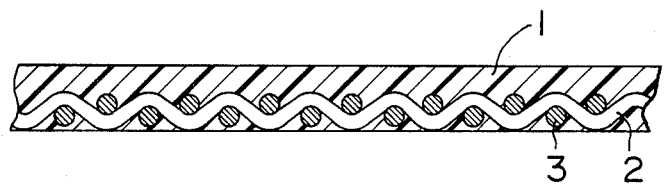

United States Patent [19]

Watanabe et al.

[11] 4,072,793

[45] Feb. 7, 1978

[54] REINFORCED ION-EXCHANGE MEMBRANE

[75] Inventors: Itaru Watanabe, Yokohama; Yasumichi Yamakoshi, Tokyo; Hirotsugu Miyauchi, Kawasaki; Sakae Tsushima; Mitsunobu Fukumoto, both of Yokohama, all of Japan

[73] Assignee: Asahi Kasei Kogyo Kabushiki Kaisha, Osaka, Japan

[21] Appl. No.: 705,431

[22] Filed: July 15, 1976

[30] Foreign Application Priority Data

July 23, 1975 Japan .............................. 50-101234[U]

[51] Int. Cl.² .............................................. C08J 5/22
[52] U.S. Cl. ..................................... 428/255; 210/502; 210/507; 428/257; 428/269; 428/272; 428/421
[58] Field of Search .................. 139/419; 210/500 M, 210/507, 502; 260/2.1 E, 2.2 R; 204/180 P, 296 M, 301; 428/257, 258, 259, 269, 245, 255, 272, 421, 422

[56] References Cited

U.S. PATENT DOCUMENTS

| | | | |
|---|---|---|---|
| 1,222,100 | 4/1917 | Hanson | 210/507 |
| 3,410,747 | 11/1968 | Orr | 428/255 |
| 3,595,730 | 7/1971 | Richardson et al. | 428/255 |
| 3,890,417 | 6/1975 | Vallance | 210/500 M |

FOREIGN PATENT DOCUMENTS 827,362  2/1960  United Kingdom ................. 210/507

*Primary Examiner*—James J. Bell
*Attorney, Agent, or Firm*—Cooper, Dunham, Clark, Griffin & Moran

[57] ABSTRACT

A leno-woven fabric of a specific construction is found to effectively reinforce an ion-exchange membrane at a scarce density of reinforcing yarns to improve electrochemical property of the reinforced ion-exchange membrane.

5 Claims, 3 Drawing Figures

REINFORCED ION-EXCHANGE MEMBRANE

This invention relates to an improved ion-exchange membrane reinforced by a fabric of leno-weave construction.

Ion-exchange membranes are brittle and yield readily to rupture while in use. While dimensional changes are generally abhored, the ion exchange membranes themselves have an inherent nature of undergoing dimensional changes due to variations in the concentration, composition, etc. of the external liquid. A general practice followed in overcoming this disadvantage is to use ion exchange membranes having a reinforcing fabric embedded in the resin making up said ion exchange membranes. The reinforced strength is generally greater as the thickness of fibers in the reinforcing fabric is more. Yet the increased fiber thickness proportionally adds to the thickness of membrane, frequently to the extent unfavorable from the standpoint of practical use. Also the more densely the fibers are embedded, the more is the reinforcing effect. Since fibrous materials in general are poor in electric conductivity, the increased density proportionally decreases the membrane area available for conduction of electricity and adds to the membrane resistance frequently to the extent of posing problems in terms of practical use.

These facts point to it being desirable that yarns of a rather small thickness be embedded at a low density, said thickness and density both falling within a range in which the practical reinforcing effect of the fabric is not sacrificed. If a woven fabric is used as the reinforcing cloth and if this fabric is in a plain-weave, twill-weave or satin-weave construction, then the strength with which the fabric texture holds fast dwindles in proportion as the density of warp yarns and filling yarns decreases, with the result that the texture of the fabric is seriously deformed to the point of posing problems in terms of actual use. The possibility of fabric texture deformation is eliminated by using a knit fabric instead. In this case, however, the thickness of fabric is large due to the larger thickness of warp yarns and filling yarns generally used and the dimensional stability of this fabric is inferior to that of a woven fabric.

The inventors made an elaborate study in search of the best fibrous materials for the reinforcement of ion exchange membranes which simultaneously satisfy these contradicting requirements and have consequently arrived at the present invention.

This invention provides areinforced a reinforced membrane comprising a fabric embedded in said ion-exchange membrane, wherein the improvement comprises using as the fabric a leno-woven fabric with a weave structure in which the numbers of warp yarns are in the range from 16 to 28, preferably from 20 to 28, per one centimeter of width and those of filling yarns in the range from 8 to 14, preferably from 10 to 14, per one centimeter of length, the square root of the denier divided by specific gravity of said warp yarn being in the range from 6 to 11 and that of said filling yarn in the range from 8 to 16.

An ion exchange membrane which is reinforced by a woven fabric of the leno-weave construction as specified above enjoys great strength, excels in dimensional stability, suffers less from loss of membrane area available for conduction of electricity and displays excellent performance as the ion exchange membrane.

Figure 2:
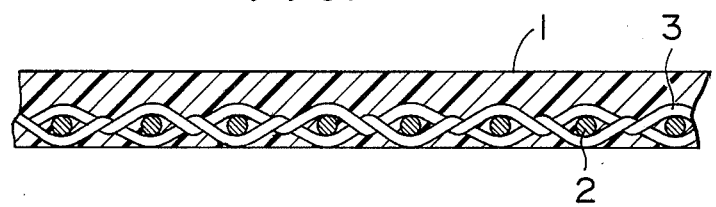
Figure 3:
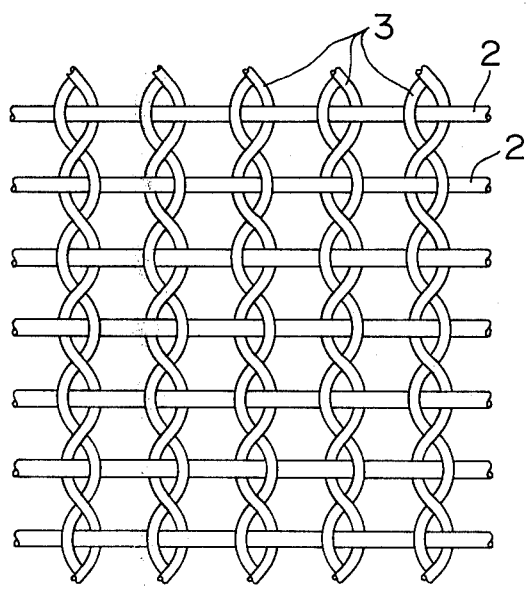

In the accompanying drawings,

FIG. 1 shows the cross section of an ion exchange membrane reinforced by a conventional woven fabric;

FIG. 2 a schematic diagram of one preferred embodiment of the present invention; and FIG. 3 a schematic diagram of the leno-weave construction. In each of the drawings, 1 stands for an ion exchange membrane, 2 for a filling yarn and 3 for a warp yarn.

Various fibrous materials are usable in the present invention, such as those made of homopolymers of copolymers selected from the group consisting of homopolymers or copolymers of ethylene, propylene, vinyl acetate, acrylonitrile, tetrafluoroethylene, vinyl chloride and vinylidene chloride, and polycondensation products of polyamides and polyesters, and regenerated celluloses such as rayon, cupra and cellulose acetate. For the preparation of a leno-weave fabric, these fibrous materials may be used either singly or in mixtures. Among these, the fibers of fluorocarbon polymers, especially polytetrafluoroethylene, are particularly preferred. Furthermore, for practice of the invention, it is most effective to reinforce an ion-exchange resin membrane made of fluorocarbon polymer with fibers of fluorocarbon polymer. This is because fibers of fluorocarbon polymer have very small friction constant and are incapable of forming fabric with coarse density unless by way of leno-weave, while they are chemically very stable and suitable for reinforcement of fluorocarbon ion-exchange resin membrane for which chemical stability is particularly required. According to the most preferred embodiment of the invention, the ion-exchange membrane is made of a fluorocarbon polymer film and warp yarns and filling yarns used for reinforcement are both polytetrafluoroethylene fibers of 70 to 260 denier and 130 to 540 denier, respectively. The number of twists generally given to the yarns are in the range of from 200/m to 2,000/m.

EXAMPLE 1

Polypropylene 75-denier yarns (24-filament, specific gravity 0.9) were woven in a leno-weave construction at a fabric density of 20 warp yarns per cm of width and 10 filling yarns per cm of length, respectively. The woven fabric had a thickness of 0.16 mm and an opening ratio of 55 percent. This woven fabric was irradiated with an electron beam of 1 megarad and thereafter immersed in a mixed solution of acrylic acid, divinyl benzene and styrene (at a mixing ratio of 20 : 10 : 70) to form a polymerized membrane having said fabric embedded therein. The membrane had a thickness of 0.22 mm. In an aqueous 0.1N caustic soda solution at 25° C, this membrane was measured to have a resistance of 4.0 $\Omega$ cm$^2$.

COMPARISON EXAMPLE 1

The yarns of Example 1 were woven in a plain-weave construction at the same fabric density of warp yarns and filling yarns as in Example 1. Because of deformed meshes in the fabric, however, the membrane contained pin holes and failed to serve its purpose. So the yarns were woven in a plain-weave construction with increased fabric densities of 30 warp yarns per cm of width and 20 filling yarns per cm of length, respectively.

A cation exchange membrane similar to that of Example 1 was prepared by using this woven fabric. The resistance of this fabric however, was as large as 7.5 $\Omega$ cm$^2$.

EXAMPLE 2

A woven fabric of a leno-weave construction was made by using polytetrafluoroethylene 200-denier yarns (30-filament; specific gravity of 2.1) as warp yarns and polytetrafluoroethylene 400-denier yarns (60-filament) as filling yarns, with densities of 25 warp yarns per cm of width and 12 filling yarns per cm of length, respectively. A copolymer of tetrafluoroethylene and perfluoro(3,6-dioxa-4-methyl-7-octene sulfonyl fluoride) (at a copolymerizing ratio of 7.5 : 1) was formed into a film 0.20 mm in thickness. Said woven fabric was embedded in the film. The membrane was subjected to hydrolysis and thereafter tested in an aqueous 0.1N caustic soda solution for resistance. The resistance is found to be 8.0 $\Omega$ cm$^2$, which is relatively smaller as compared with conventionally known reinforced membranes of perfluorocarbon.

COMPARISON EXAMPLE 2

When the yarns of Example 2 were woven in a plain-weave construction at the same density of warp yarns and filling yarns as in Example 2, the fabric suffered from deformed meshes and therefore failed to produce a uniform ion exchange membrane. So the yarns were woven in a plain-weave construction with a fabric density of 32 warp yarns/cm and 16 filling yarns/cm. The ion exchange membrane having this fabric of plain-weave construction embedded therein was subjected to hydrolysis and then tested for resistance by a procedure similar to that of Example 2. The resistance was found to be 10.5 $\Omega$ cm$^2$.

COMPARISON EXAMPLE 3

Polytetrafluoroethylene 100-denier yarns (15-filament) as warp yarns and polytetrafluoroethylene 200-denier yarns (30-filament) as filling yarns were woven in a leno-weave construction at a fabric density of 14 warp yarns per cm of width and 7 filling yarns per cm of length. This fabric had a thickness of 0.15 mm. In the course of embedding this fabric in ion-exchange membrane, however, deformed meshes are formed to fail in production of a uniform reinforced ion-exchange membrane. The reinforced membrane obtained was also poor in working efficiency.

COMPARISON EXAMPLE 4

Polytetrafluoroethylene 200-denier yarns (30 filament) as warp yarns and polytetrafluoroethylene 400-denier yarns as filling yarns were woven in a leno-weave construction at a fabric density of 30 warp yarns per cm of width and 15 filling yarns per cm of length. By use of this fabric, a reinforced ion-exchange membrane was prepared in the same manner as in Example 2, and the reinforced membrane was then subjected to hydrolysis. The electric resistance of this membrane in 0.1N aqueous caustic soda solution was measured to be 9.5 $\Omega$ cm$^2$.

COMPARISON EXAMPLE 5

Polytetrafluoroethylene 300-denier yarns (45 filament) as warp yarns and polytetrafluoroethylene 600-denier yarns (90 filament) as filling yarns were woven in a leno-weave construction at a fabric density of 16 warp yarns per cm of width and 8 filling yarns per cm of length. When this fabric was attempted to be embedded in the membrane 0.20 mm in thickness as prepared in Example 2, it was impossible to embed said fabric completely in the membrane. When this incompletely embedded membrane, after being subjected to hydrolysis, was provided for use as ion-exchange membrane in electrolysis, there ensued peeling between the resin and the fabric.

COMPARISON EXAMPLE 6

Polytetrafluoroethylene 50-denier yarns (8 filament) as warp yarns and polytetrafluoroethylene 100-denier yarns (15 filament) as filling yarns were woven in a leno-weave construction at a fabric density of 28 warp yarns per cm of width and 14 filling yarns per cm of length. This fabric had a thickness of 0.12 mm and tensile strengths of 1.9 kg/cm in the longitudinal direction and 2.1 kg/cm-width and in the transverse direction, respectively. The fabric is insufficient in strength as a reinforcing material for ion-exchange membrane to be used under severe conditions.

What is claimed is:

1. In a reinforced ion-exchange membrane comprising a fabric embedded in said ion-exchange membrane, the improvement which comprises using as the fabric a leno-woven fabric with a weave structure in which the numbers of warp yarns are in the range from 16 to 28 per one centimeter of width and those of filling yarns in the range from 8 to 14 per one centimeter of length, the square root of the denier divided by specific gravity of said warp yarn being in the range from 6 to 11 and that of said filling yarn in the range from 8 to 16.

2. An ion-exchange membrane as claimed in claim 1, wherein the leno-woven fabric is made of polypropylene fibers.

3. An ion-exchange membrane as claimed in claim 1, wherein the leno-woven fabric is made of fibers of a fluorocarbon polymer.

4. An ion-exchange membrane as claimed in claim 3, wherein the fluorocarbon polymer is polytetrafluoroethylene.

5. The ion-exchange membrane according to claim 4, wherein the ion-exchange membrane is of a fluorocarbon polymer film and warp yarns are polytetrafluoroethylene fibers of 70 to 260 denier and filling yarns are polytetrafluoroethylene fibers of 130 to 540 denier.

* * * * *